United States Patent
Whitehouse

(10) Patent No.: US 10,268,717 B2
(45) Date of Patent: *Apr. 23, 2019

(54) SYSTEM AND METHOD FOR READING FILE BLOCKS

(71) Applicant: Red Hat, Inc., Raleigh, NC (US)

(72) Inventor: Steven Whitehouse, Swansea (GB)

(73) Assignee: Red Hat, Inc., Raleigh, NC (US)

( * ) Notice: Subject to any disclaimer, the term of this patent is extended or adjusted under 35 U.S.C. 154(b) by 540 days.

This patent is subject to a terminal disclaimer.

(21) Appl. No.: 14/942,083

(22) Filed: Nov. 16, 2015

(65) Prior Publication Data

US 2016/0070744 A1    Mar. 10, 2016

Related U.S. Application Data

(63) Continuation of application No. 13/934,154, filed on Jul. 2, 2013, now Pat. No. 9,223,791.

(51) Int. Cl.
*G06F 17/30* (2006.01)

(52) U.S. Cl.
CPC .. *G06F 17/30371* (2013.01); *G06F 17/30091* (2013.01); *G06F 17/30094* (2013.01); *G06F 17/30194* (2013.01)

(58) Field of Classification Search
CPC ......... G06F 17/30091; G06F 17/30094; G06F 17/30194; G06F 17/30371
See application file for complete search history.

(56) References Cited

U.S. PATENT DOCUMENTS

| | | | |
|---|---|---|---|
| 5,371,885 A | 12/1994 | Letwin | |
| 7,333,993 B2 | 2/2008 | Fair | |
| 7,509,329 B1 * | 3/2009 | Leverett | G06F 3/0605 |
| 7,631,148 B2 | 12/2009 | Fair | |
| 7,809,883 B1 | 10/2010 | Fair et al. | |
| 7,827,349 B1 | 11/2010 | Fair | |
| 7,966,289 B2 | 6/2011 | Lu et al. | |
| 8,171,064 B2 | 5/2012 | Makkar et al. | |
| 8,204,871 B1 * | 6/2012 | Pawar | G06F 17/30132 |
| | | | 707/639 |
| 9,542,401 B1 * | 1/2017 | Veeraswamy | G06F 17/30088 |
| 2005/0154825 A1 | 7/2005 | Fair | |
| 2005/0246382 A1 * | 11/2005 | Edwards | G06F 3/061 |

\* cited by examiner

*Primary Examiner* — Shew Fen Lin
(74) *Attorney, Agent, or Firm* — Haynes and Boone, LLP

(57) ABSTRACT

A system and method for reading file blocks includes reading an inode associated with the file from the file system, the inode including one or more first block pointers, determining a height of a file tree associated with the file, and determining whether a value of a second block pointer selected from the one or more first block pointers is consistent with the file having been stored using a block allocation pattern. When the value of the second block pointer is consistent with the file having been stored using the block allocation pattern the method further includes pre-fetching a plurality of file blocks based on the block allocation pattern, verifying that the pre-fetched file blocks are consistent with the file tree, and retrieving one or more data blocks of the file. In some examples, the block allocation pattern corresponds to the file being stored in streaming order to consecutively and contiguously located blocks.

16 Claims, 6 Drawing Sheets

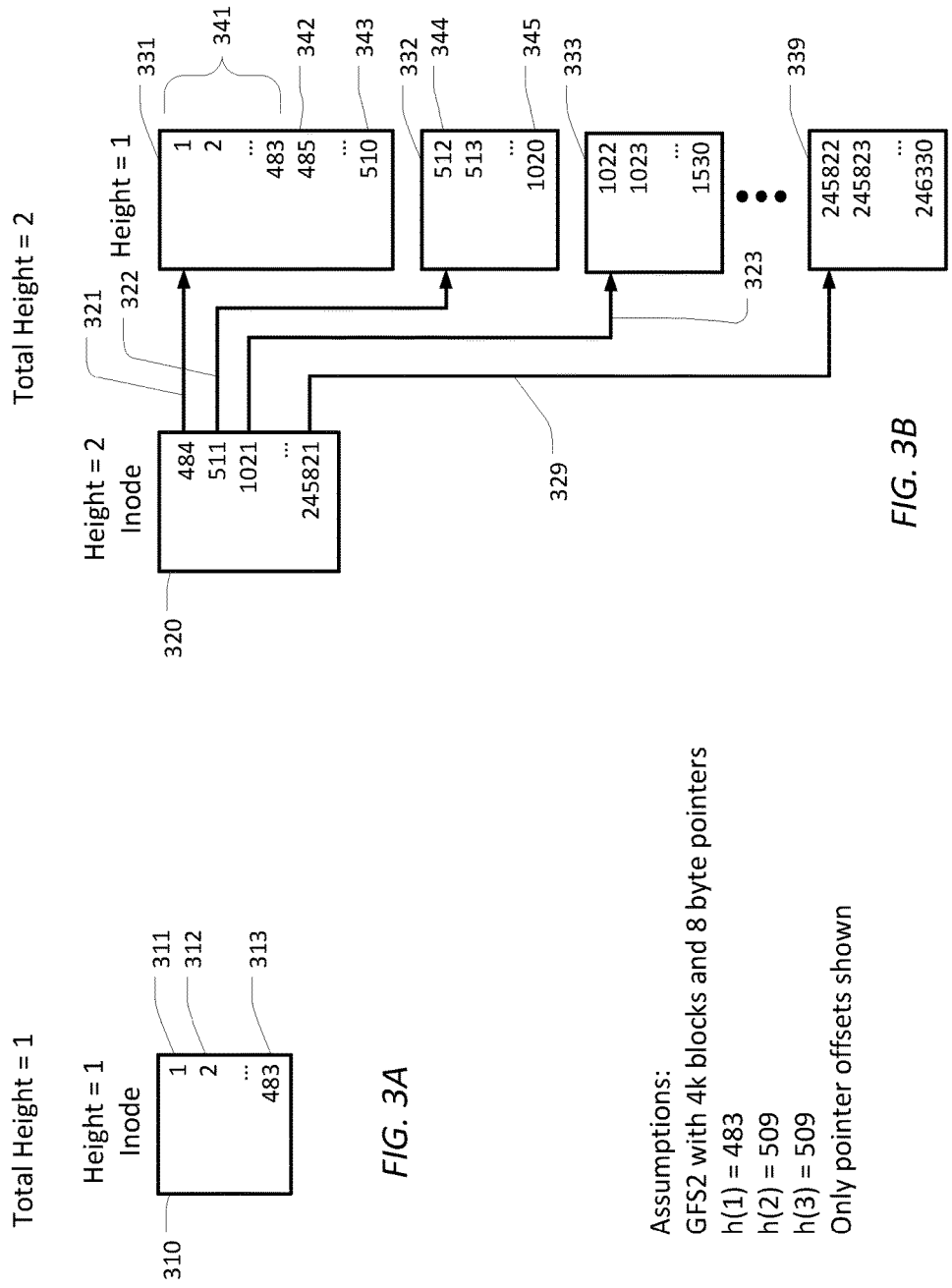

SYSTEM AND METHOD FOR READING FILE BLOCKS

CROSS-REFERENCE TO RELATED APPLICATIONS

This application is a continuation of U.S. patent application Ser. No. 13/934,154, filed on Jul. 2, 2013, the full disclosure of which is incorporated by reference herein in its entirety and for all purposes.

FIELD OF THE INVENTION

The present disclosure relates generally to computing systems, and more particularly to reading file blocks.

BACKGROUND OF THE INVENTION

As the value and use of information continues to increase, individuals and businesses seek additional ways to process and store information. One option is a computing system. Computing systems may vary in complexity from a single processor operating in relative isolation to large networks of interconnected processors. The interconnected processors may be in close proximity to each other or separated by great distances both physically and as distance is measured in computer networking terms. The interconnected processors may also work together in a closely cooperative fashion or in a loose weakly coupled fashion. Because technology and processing needs and requirements may vary between different applications, the structure and arrangement of the computing system may vary significantly between two different computing systems. The flexibility in computing systems allows them to be configured for both specific users, specific uses, or for more general purposes. Computing system may also include a variety of hardware and software components that may be configured to process, store, and communicate information based on the needs of the users and the applications.

Additionally, some examples of computing systems include non-transient, tangible machine-readable media that include executable code that when run by one or more processors, may cause the one or more processors to perform the steps of methods described herein. Some common forms of machine readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Computing systems are typically used to store, process, and retrieve information and content. Organization and retrieval of the stored information and content is typically constrained by the storage tools and mechanisms used to store the information and content. For example, when files are stored in a block-based file system, such as the Global File System 2 (GFS2), each of the files are typically split up into a number of uniformly-sized blocks. Using blocks is a flexible way of handling files of varying sizes while avoiding the need to store every file using contiguous storage space in the file system. For example, larger files using many data or direct blocks may be stored in blocks at many different locations within the file system. One complication of using blocks is that the file system needs to keep track of all of the data blocks used by each file using pointers. And because small files typically have only a few data blocks and pointers and larger files may have thousands, millions, or even more data blocks and pointers, a flexible tree structure or file tree, stored in its own blocks called indirect blocks, is often used to keep track of the pointers. The top of the file tree is typically stored in a block called an inode. For small files the file tree may only have a height of one with the inode containing data or pointers to data blocks, but for larger files the file tree may have a greater height with the inode containing pointers to indirect blocks, which may in turn include pointers to data blocks or indirect blocks depending upon the height of the file tree. When a size of a file is known before a file is to be stored in the file system, the arrangement of the blocks storing the file tree may be laid out efficiently using consecutive blocks for both the indirect blocks and the data blocks. However, when the size of the file is not known, which may commonly occur, for example, when files are streamed over a network or an audio or video recording is taking place, it is not possible to efficiently lay out the indirect blocks and the data blocks so that delays may occur when the file system later reads files and the indirect blocks and the data blocks are not stored in consecutive blocks within the file system.

Accordingly, it would be desirable to provide improved methods and systems for reading data and indirect blocks of a file when they are not stored in consecutive blocks.

BRIEF SUMMARY OF THE INVENTION

According to one example, a method of reading blocks from a file stored in a file system includes reading an inode associated with the file from the file system, the inode including one or more first block pointers, determining a height of a file tree associated with the file, and determining whether a value of a second block pointer selected from the one or more first block pointers is consistent with the file having been stored using a block allocation pattern. When the value of the second block pointer is consistent with the file having been stored using the block allocation pattern the method further includes pre-fetching a plurality of file blocks from the file system based on the block allocation pattern, verifying that the plurality of pre-fetched file blocks is consistent with the file tree, and retrieving one or more data blocks of the file.

According to another example, a non-transitory machine-readable medium comprising a plurality of machine-readable instructions which when executed by one or more processors associated with a file system are adapted to cause the one or more processors to perform a method. The method includes reading an inode associated with the file from the file system, the inode including one or more first block pointers, determining a height of a file tree associated with the file, and determining whether a value of a second block pointer selected from the one or more first block pointers is consistent with the file having been stored using a block allocation pattern. When the value of the second block pointer is consistent with the file having been stored using the block allocation pattern the method further includes pre-fetching a plurality of file blocks from the file system based on the block allocation pattern, verifying that the plurality of pre-fetched file blocks is consistent with the file tree, and retrieving one or more data blocks of the file.

According to yet another example, a system for reading files includes one or more processors executing a device driver, a pre-fetch buffer coupled to the one or more processors, a file storage system storing a file, a plurality of first blocks stored in the file system and associated with the file, the plurality of first blocks including an inode, one or more first indirect blocks, and one or more direct blocks, and a tree structure associated with the file including the inode, the first indirect blocks and the direct blocks. The inode includes metadata and one or more first block pointers pointing to one or more second indirect blocks included in the one or more first indirect blocks. The device driver reads the inode, determines a height of the tree structure based on information associated with the metadata, and determines whether a value of a second block pointer selected from the one or more first block pointers is consistent with a known allocation pattern consistent with the file having been stored in a streaming order to consecutive and contiguous blocks. When the value of the second block pointer is consistent with the known allocation pattern the device driver reads a plurality of second blocks from the file system based on the known allocation pattern, stores the second blocks in the pre-fetch buffer, verifies that the second blocks are consistent with the tree structure, and retrieves one or more of the one or more direct blocks.

BRIEF DESCRIPTION OF THE DRAWINGS

FIGS. 3A-3C are simplified diagrams of consecutive and contiguous block allocation in the GFS 2 file system for a file tree of various heights according to some examples.

In the figures, elements having the same designations have the same or similar functions.

DETAILED DESCRIPTION OF THE INVENTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Figure 1:
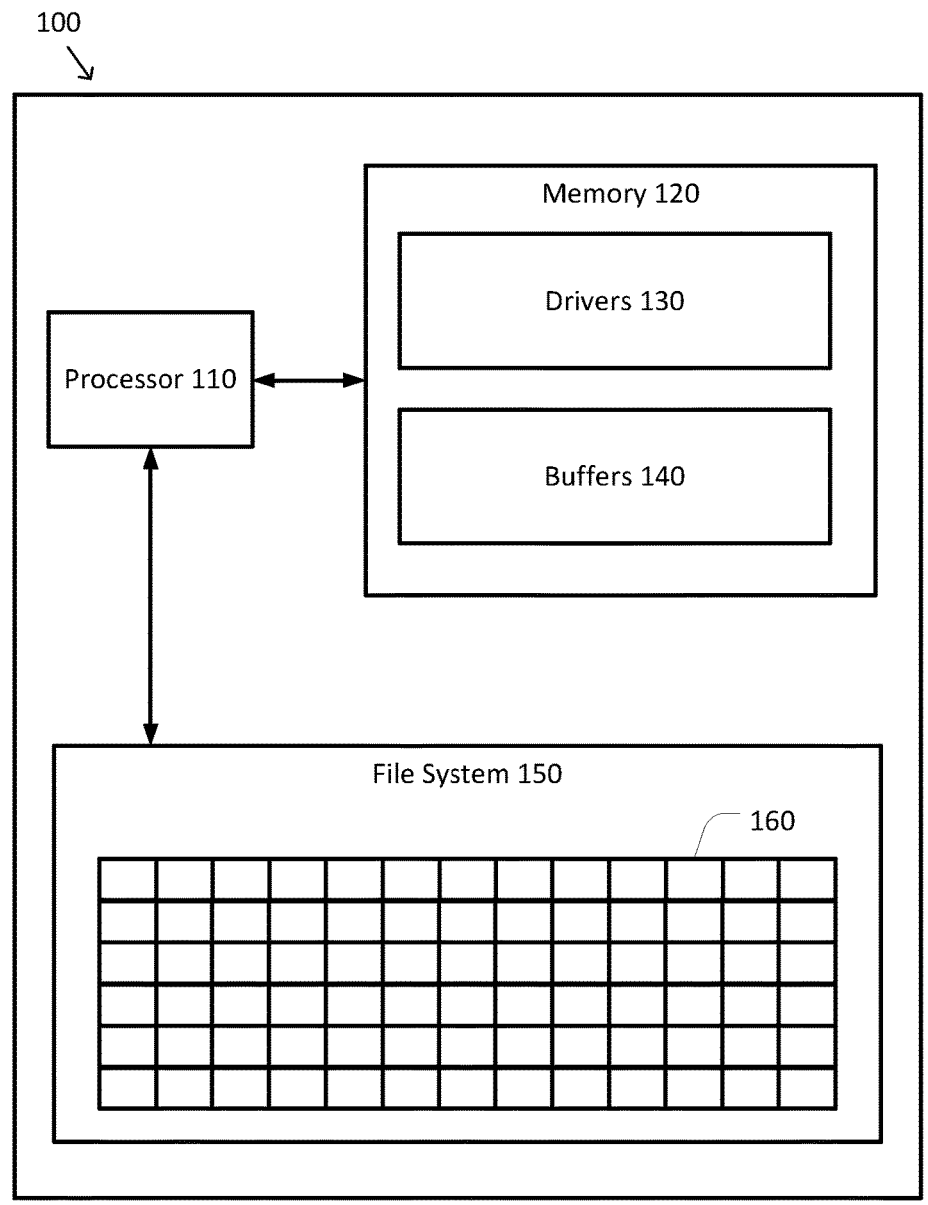
FIG. 1 is a simplified diagram of a computing system according to some examples.

FIG. 1 is a simplified diagram of a computing system 100 according to some examples. As shown in FIG. 1, computing system 100 includes one or more processors 110 coupled to memory 120. In some examples, the one or more processors 110 may control operation and/or execution of hardware and/or software components in computing system 100.

Memory 120 may further be used to store code and data for various software components. In some examples, the software components may include one or more device drivers 130 for communicating with and controlling hardware devices such as I/O devices, storage devices, and/or the like. Memory 120 may further be used to store data to support I/O and/or storage operations using one or more buffers 140. Memory 120 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Computing system 100 may further include a file system 150. As shown, file system 150 includes a storage area that is divided into a plurality of blocks 160. In some examples, each of the plurality of blocks 160 is uniform in size and may further be referenced and/or located using a block number. File system 150 is coupled to the one or more processors 110, and the one or more processors 110 may perform read, write, and/or other storage operations as directed by the one or more device drivers 130. The one or more processors 110 may also use the one or more buffers 140 to temporarily store data associated with the read, write, and/or other storage operations. In some examples, the plurality of blocks may be located on any kind of storage medium or machine-readable media. Some common forms of machine readable media suitable for the file system may include floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read.

Figure 2:
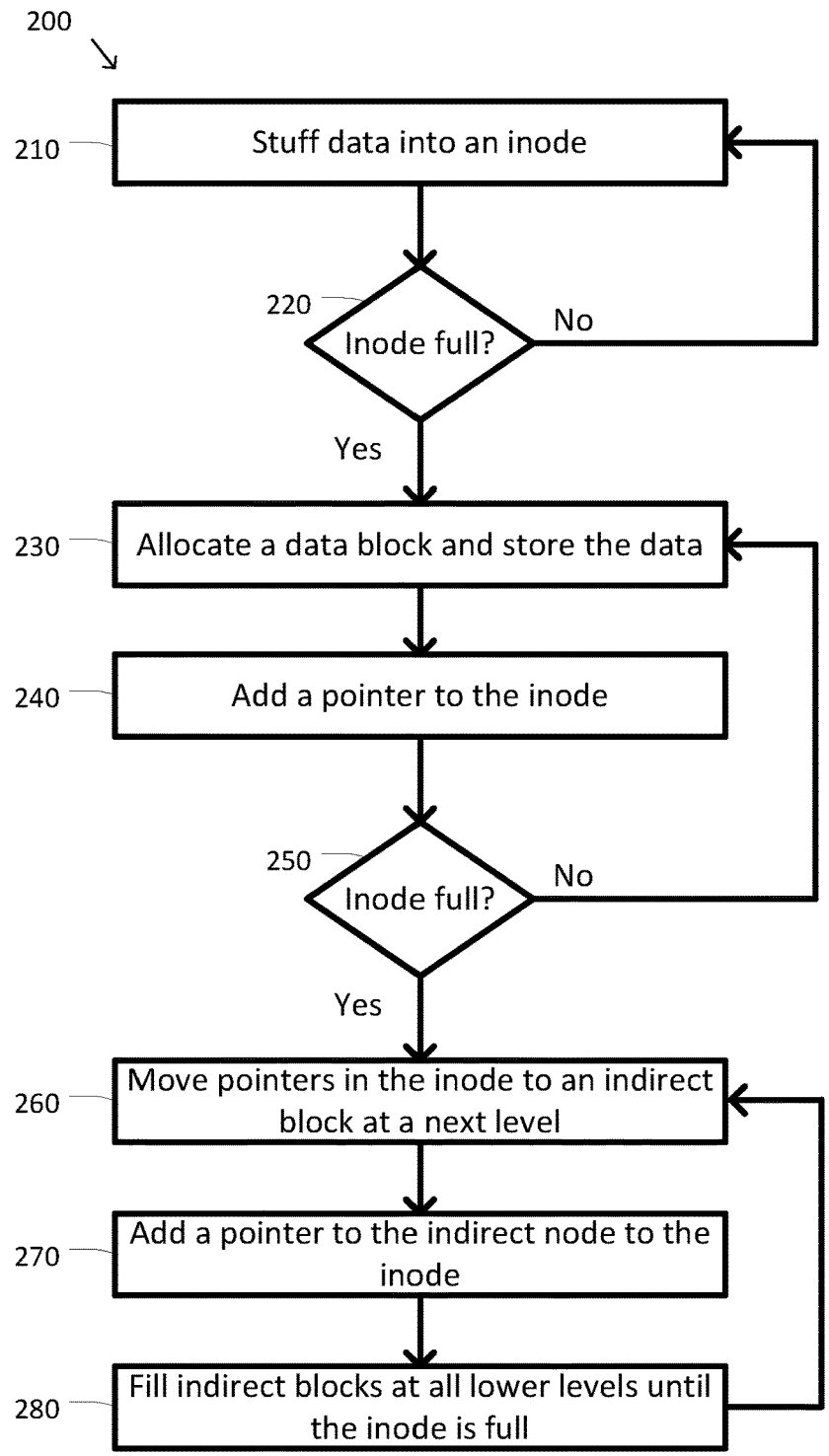
FIG. 2 is a simplified diagram of a method of file storage using blocks according to some examples.

FIG. 2 is a simplified diagram of a method 200 of file storage using blocks according to some examples. In some examples, one or more of the processes 210-280 of method 200 may be implemented, at least in part, in the form of executable code stored on non-transient, tangible, machine readable media that when run by one or more processors (e.g., the one or more processors 110 associated with the file system 150) may cause the one or more processors to perform one or more of the processes 210-280.

As shown in FIG. 2 and as further described below, method 200 depicts file storage using blocks in the context of the GFS2. The file tree of the inode, indirect blocks, and data blocks of the GFS2 is designed to provide equal-height trees so that the number of indirect blocks traversed in the file tree to reach any data block is the same. Other file systems using blocks, such as the second extended file system (ext2) and the third extended file system (ext3) may use variations in the file tree without departing significantly from the general approach of method 200. For example, both ext2 and ext3 use a file tree where fewer indirect blocks are used to access the initial data blocks of a file in comparison to the later data blocks of the file. Method 200 further describes file storage using blocks when the size of the file is not known in advance, for example when the file is received in streaming order from beginning to end. Thus, method 200 applies to situations where an initial assumption is that the file to be stored is small and, as more data is received and the file becomes larger, the file tree is adjusted to account for the ever growing size of the file.

At a process 210, data is stuffed in an inode. In some file systems, such as GFS2, data for very small files may be stored directly in the inode. This is often referred to as stuffing. When the initial data is received by the file system, a block for an inode is allocated from among the unused blocks being tracked by the file system and assigned to the file. Data is then initially stored in the inode. At this point the file tree has a height of 0 as the file is stored without using any pointers. In some examples, the inode may include metadata indicating that the height of the file tree is 0.

At a process 220, it is determined whether the inode is full. As the streaming data is received by the file system it is stuffed in the inode using process 210 until the inode becomes full. When the inode becomes full and more data is received for the file, the data is transferred to a data block and the file tree for the file begins to get built.

At a process 230, a data block is allocated and the data is stored. When the inode becomes full, the data is moved to a data block. The data block is first allocated by the file system by allocating an unused block. Once the data block is allocated, the data is copied from the inode and stored in the allocated data block. In some examples, the allocated data block may be able to store more data than the inode, so additional data from the streaming file may also be stored in the allocated data block. In many cases, the data block further includes metadata identifying the allocated data block as a data block.

At a process 240, a pointer is added to the inode. In order for the file system to keep track of the file, it records the location of the data block allocated during process 230. Each block in the file is generally identified by a block number, and the block number of the allocated data block is added to the inode as a pointer to the allocated data block. At this point the file tree for the file has a height of 1, indicating that the inode contains pointers to data blocks. In some examples, the metadata in the inode may be updated to indicate that the height of the file tree is now 1.

At a process 250, it is determined whether the inode is full. As data for the file is received for storage, additional data blocks are allocated, the data is stored in the additional data blocks, and pointers to each of the additional data blocks are added to the inode using processes 230 and 240. This continues until the inode fills with pointers to the additional data blocks. When it is determined that the inode is filled with pointers and more data is to be stored, the height of the file tree is increased by 1 using a process 260.

At the process 260, the pointers in the inode are moved to an indirect block at a next level in the file tree. Whenever the inode fills with pointers, the height of the file tree is increased by 1. This may be done by allocating an indirect block from the unused blocks in the file system and then copying the pointers in the inode to the allocated indirect block. In some examples, the indirect block further includes metadata identifying the allocated indirect block as an indirect block and the level of the indirect block in the file tree.

At a process 270, a pointer to the indirect block is added to the inode. Similar to process 230, the block number of the allocated indirect block may be added to the inode as the pointer to the indirect block from the inode. In some examples, the metadata in the inode may be updated to indicate that the height of the file tree is now increased by 1.

At a process 280, indirect blocks at all lower levels are filled until the inode is full. As data continues to be received by the file system for the file, data blocks and indirect blocks are allocated and filled until the inode once again becomes full. In the example of GFS2, data blocks are allocated and filled, and a pointer is then added to an indirect block at level 1 of the file tree for each of the data blocks. When the indirect block at level 1 becomes full, a second indirect block at level 1 is allocated and a pointer is added to the indirect block at level 2. The second indirect block then fills with pointers to additional data blocks. The process then continues up the levels of the file tree so that when the indirect block at level 2 becomes full another indirect block at level 2 is allocated and begins filling as further indirect blocks at level 1 and data blocks are allocated and filled. The process then continues up the file tree in recursive fashion until the inode again becomes full of pointers. When the inode becomes full, method 200 returns again to process 260 where the height of the file tree is again increased by 1 and the pointers in the inode are copied to an indirect block at the next level of the file tree. In some examples, when an indirect block may be able to store more pointers than the inode, additional pointers are added to the indirect block before another indirect block in the same level of the file tree is allocated and begins to get filled with pointers.

The actual location (i.e., block numbers) of each of the indirect blocks and data blocks may depend on how unused blocks are managed by the file system. For example, when the blocks in the file system are fragmented and unused blocks are made available for allocation in multiple non-contiguous areas of the file system, the allocation of blocks to a file may not follow a regular pattern. In contrast, when the file system includes large areas of consecutive and contiguous unused blocks, the allocation of blocks to a file written in streaming order may follow a predictable pattern. There are several situations that may prevent unused blocks from being consecutive and contiguous. For example, the situations may include reaching the end of a resource group, reaching the end of the file system, encountering other allocated and/or used inode, data, or indirect blocks, encountering bad and useable blocks, and/or the like.

Figure 3C:
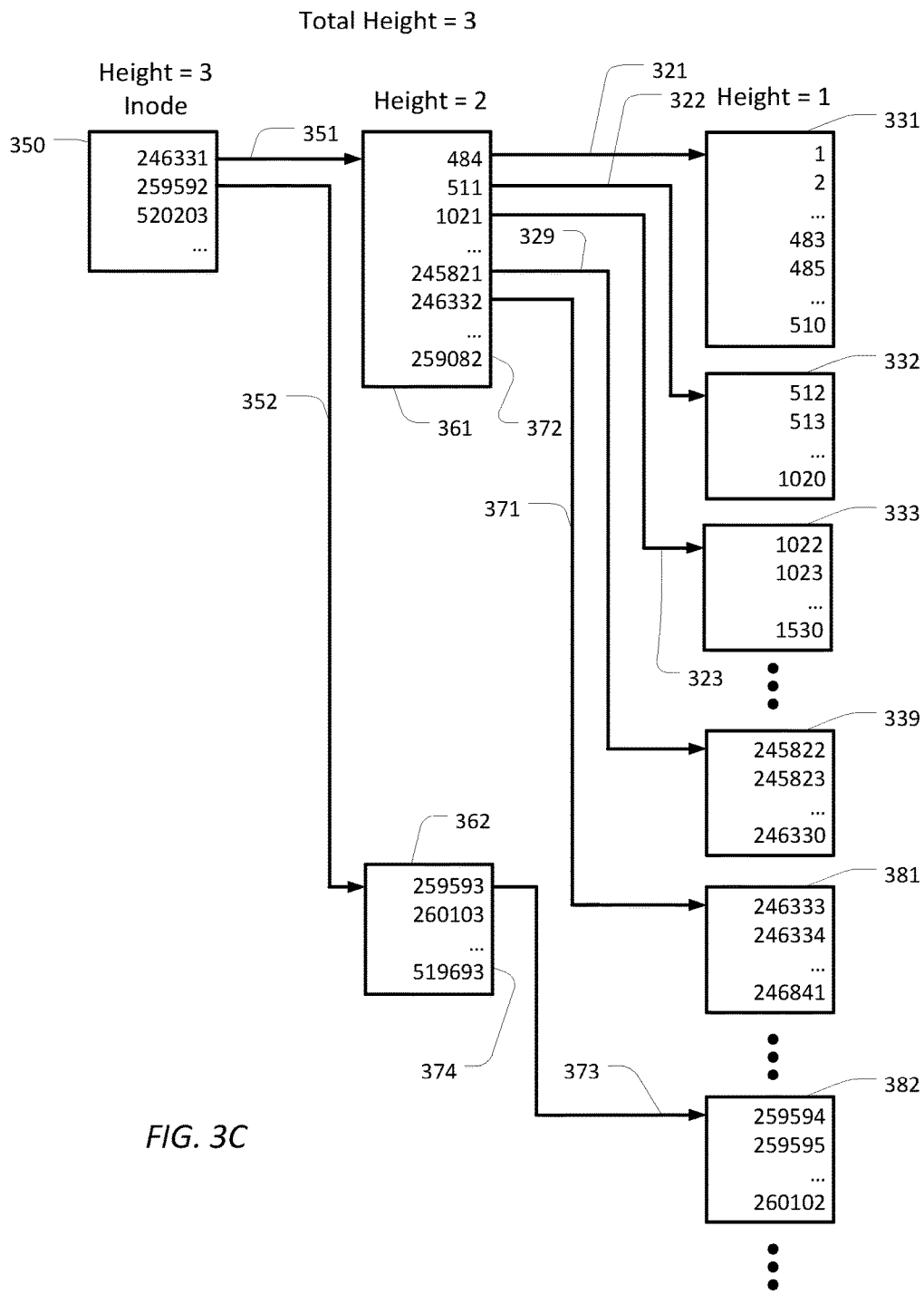

FIGS. 3A-3C are simplified diagrams of consecutive and contiguous block allocation in the GFS2 file system for a file tree of various heights according to some examples. The block allocations shown for the GFS2 file system occur when a file is written in streaming order so that data from the beginning of the file is stored first and data from the end of the file is stored last using method 200 of FIG. 2. In order to achieve the block allocations of FIGS. 3A-3C, several assumptions regarding the blocks and pointers apply. Block sizes of 4 kbytes with 8 byte pointers or block numbers are used. Accounting for the metadata overhead of inodes and indirect blocks, each inode may store up to 483=h(1) pointers and each indirect block, no matter its height in the file tree, may store up to 509=h(2)=h(3) pointers. Additionally, only pointer offsets are shown in FIGS. 3A-3C, so if the inode is stored at a block with a block number of N, a pointer or an offset of n in FIGS. 3A-3C would indicate that the corresponding block has a block number of N +n. Further, it is assumed that the blocks are allocated contiguously with no gaps caused by earlier allocated blocks, bad blocks, and/or the like.

FIG. 3A shows the allocation of blocks up to the point where the file tree has a height of 1. Because the height is only 1, an inode 310 may contain up to 483 pointers to data blocks. And although inode 310 is shown with all its pointers filled, it is possible for inode 310 to have fewer pointers at earlier stages during method 200 or when the file being stored uses less than 483 data blocks. As inode 310 is created and updated using method 200, the allocation of blocks proceeds as follows. After the size of the file exceeds the capacity of inode 310 using stuffing (i.e., after inode 310 is detected as being full during process 220), a first data block is allocated using process 230 at offset 1, the first block contiguously available after inode 310. Data is stored in the first data block at an offset of 1 and a pointer 311 is added to inode 310 pointing to the first data block using processes 230 and 240. As more data is stored in the file, processes 230 and 240 repeat, allocating data blocks in consecutive and contiguous order. Thus, a second data block is allocated at an offset of 2 and a corresponding pointer 312 is added to inode 310. This continues until a 483rd data block is allocated at an offset of 483 and a corresponding pointer 313 is added to inode 310. At this point, inode 310 is determined to be full using process 250 because inode 310 may only store 483 pointers.

When the file contains additional data, the height of the file tree is increased to 2 as shown in FIG. 3B. As with FIG. 3A, FIG. 3B is shown with every inode pointer and indirect pointer filled, however, it is understood that fewer blocks and pointers may be used based on the size of the file. Using process 260, a block at an offset of 484 is allocated as an indirect block 331 with a height of 1. The pointers 311-313 are then copied to indirect block 331 as pointers 341. Inode 310 is then converted to inode 320 by changing the metadata for the file tree height to 2 and a pointer 321 pointing to indirect block 331 is added to inode 320 using process 270. As more data is stored, indirect block 331 fills with pointers to additional data blocks as they are allocated in order. Thus, a pointer 342 to a data block at an offset of 485 is first added, and the process continues until indirect block 331 fills to capacity with 509 pointers as depicted by a pointer 343 to a data block at an offset of 510. Thus, indirect block 331 is filled with pointers to blocks with offsets from 1 to 510 with the exception of 484, which is the offset for indirect block 331.

Once indirect block 331 is filled, a second indirect block 332 is allocated at the next contiguous block offset of 511. A pointer 322 is added to inode 320 that points to indirect block 332. Indirect block 332 is then filled in order with pointers to data blocks beginning with a pointer 344 to a data block with an offset of 512. This continues for 508 more pointers until a pointer 345 to a data block with an offset of 1020 is added to indirect block 332. Once indirect block 332 is filled, an indirect block 333 is allocated with a block offset of 1021 and a corresponding pointer 323 is added to inode 320. Indirect block 333 is then filled with pointers to data blocks. The process of allocating and filling indirect blocks with pointers to data blocks continues until a last indirect block 339 with an offset of 245821 is allocated and a corresponding pointer 339 is added to inode 320, which becomes full. Like indirect block 331, indirect blocks 332-339 also have a height of 1.

Careful observation of FIG. 3B reveals several observations regarding the pattern of offsets. First, the first pointer in inode 320 has an offset of 484=1+483=1+h(1), or one more than the pointer capacity of an inode. Second, other than the first two pointers 321 and 322 in inode 320, each successive pointer in inode 320 differs by an offset of 510=1+h(2), or one more than the pointer capacity of an indirect block. And finally, the last pointer in indirect block 339 points to a data block with an offset of 246330=483+ 483*509=h(1)+h(1)*h(2), which is 483 indirect blocks 331-339 plus 483*509 data blocks pointed to by the pointers in indirect blocks 331-339.

When the file contains additional data, the height of the file tree is further increased to 3 as shown in FIG. 3C. As with FIGS. 3A and 3B, FIG. 3C is shown with every inode pointer and indirect pointer filled, however, it is understood that fewer blocks and pointers may be used based on the size of the file. Using process 260, a block at an offset of 246331 is allocated as an indirect block 361 with a height of 2. The pointers 321-329 are then copied to indirect block 361. Inode 320 is then converted to inode 350 by changing the metadata for the file tree height to 3, and a pointer 351 pointing to indirect block 361 is added to inode 350 using process 270. As more data is stored, indirect block 361 fills with pointers to additional indirect blocks with a height of 1 as they are allocated in order. Thus, a pointer 371 to an indirect block 381 at an offset of 246332 is first added, and the process continues until indirect block 361 fills to capacity with 509 pointers to indirect blocks as depicted by a pointer 372 to an indirect block (not shown) at an offset of 259082. As with indirect blocks 331-339, each of the additional indirect blocks pointed to by indirect block 361 include pointers to data blocks.

Once indirect block 361 is filled, a second indirect block 362, with a height of 2, is allocated at the next contiguous block offset of 259592. A pointer 352 is added to inode 350 that points to indirect block 362. Indirect block 362 is then filled in order with pointers to indirect blocks, with a height of 1, beginning with a pointer 373 to an indirect block with an offset of 259593. This continues for 508 more pointers until a pointer 374 to an indirect block with an offset of 519693 is added to indirect block 362. Once indirect block 362 is filled, additional indirect blocks, with a height of 2, are allocated and corresponding pointers are added to inode 350.

Careful observation of FIG. 3C reveals several observations regarding the pattern of offsets. First, the first pointer in inode 320 has an offset of 246331=1+483+483*509=1+ h(1)+h(1)*h(2), or one more than the capacity of the height=2 file tree. Second, other than the first two pointers 351 and 352 in inode 350, each successive pointer in inode 350 differs by an offset of 260611=1+510+510*510=1+h (2)+h(2)*h(3). Third, other than pointers 321-329 in indirect block 361, each successive pointer in an indirect block, with a height=2, differs by an offset of 510=1+h(2). And finally, after allocation of all the blocks in FIG. 3C, the next block available for allocation has an offset of 1+h(1)+h(1)*h(2)+ h(1)*h(2)*h(3).

The allocations as shown in FIGS. 3A-3C may be extended to a file tree with heights of 4 or more. As each level is added to the file tree, the observations regarding the pattern of offsets may be generalized as long as the data from the file continues to be written in streaming order to consecutive and contiguous blocks. In more general form, the first pointer offset in an inode with a height k is governed by Equation 1 where the pointer capacity at each level of the tree is denoted by the function h.

$$\text{First pointer offset} = 1 + \Sigma_{i=1}^{k} \Pi_{j=1}^{i} h(j) \quad \text{Eqn. 1}$$

Successive pointers in an inode or an indirect block, with the exception of the first two pointers in the inode and the first pointer in the first indirect block, at each level of the file tree have offsets that differ according to Equation 2, where k is the level of the inode or the indirect block.

$$\text{Successive pointer difference} = 1 + \Sigma_{i=2}^{k} \Pi_{j=2}^{i} h(j) \quad \text{Eqn. 2}$$

Although the patterns in the offsets of the pointers may be determined via Equations 1 and 2, it is also possible to determine the expected values via experimentation or simulation of a file being written in streaming order into consecutive and contiguous blocks. Whether the expected values are determined via equation, experimentation, or simulation the expected values may be pre-computed and recorded for lookup in a table indexed by the levels of the file tree.

As discussed above and further emphasized here, FIGS. 2 and 3 are merely examples which should not unduly limit the scope of the claims. One of ordinary skill in the art would recognize many variations, alternatives, and modifications. According to certain examples, different patterns in the offsets may occur in file systems that allocate blocks differently than GFS2. In some examples, the first pointer offset in an inode and differences in offsets between successive pointers in an inode or an indirect block may also be determined using corresponding equations, experimentation, and/or simulation.

Figure 4:
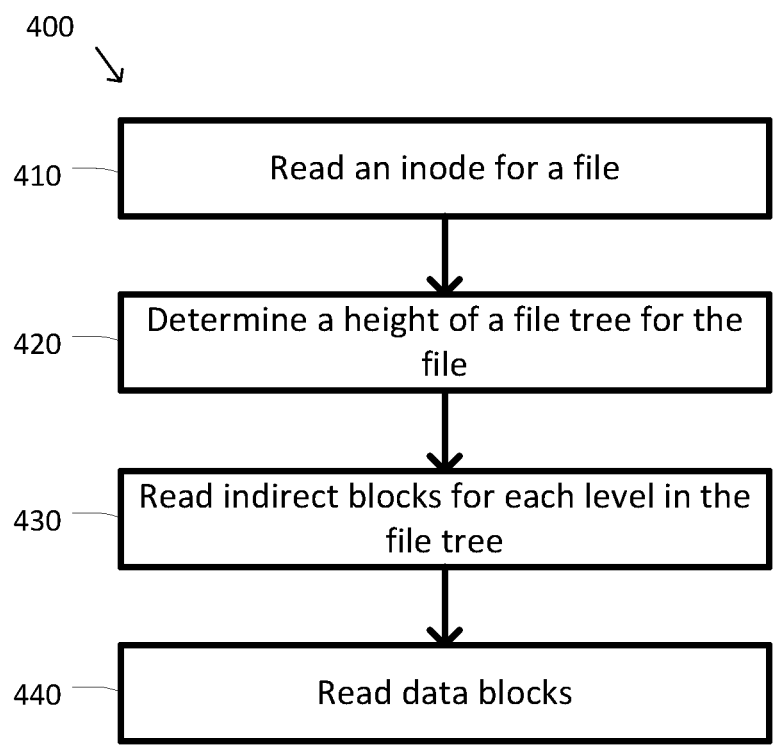
FIG. 4 is a simplified diagram of a method of reading file blocks according to some examples.

FIG. 4 is a simplified diagram of a method 400 of reading file blocks according to some examples. In some examples, one or more of the processes 410-440 of method 400 may be implemented, at least in part, in the form of executable code stored on non-transient, tangible, machine readable media that when run by one or more processors (e.g., the one or more processors 110 associated with the file system 150) may cause the one or more processors to perform one or more of the processes 410-440.

At a process 410, an inode for a file is read. When a file is stored in a file system using blocks, reading the file begins with the inode associated with the file as it represents a root of a file tree used to record and locate all the indirect blocks and data blocks. A block number for the inode may be determined using directory and/or other data structures for locating files within the file system. Once the block number for the inode is known, the inode may be read from the file system.

At a process 420, a height of the file tree for the file is determined. The contents of the inode are examined to determine the height of the file tree. This information is typically included in metadata stored in the inode.

At a process 430, indirect blocks for each level in the file tree are read. Depending upon the height of the file tree determined during process 420, the indirect blocks for each level of the file tree are read and traversed using pointers stored in the inode and the indirect blocks to find the data blocks. When the file is small enough and the height is 0, no indirect blocks are read as the data for the file may be stuffed in the inode. When the height is 1, no indirect blocks are read as the inode contains pointers to the data blocks. When the height is 2 or larger, the pointers in the inode are used to locate indirect blocks at the next lower level and then the pointers in the indirect blocks are used to move down the levels of the file tree until the pointers to the data blocks are found in level 1 of the file tree.

At a process 440, the data blocks are read. Once the pointers or block numbers of the data blocks are read during process 430, the data may be read from the data blocks.

As shown in FIG. 4, method 400 may be used by any file system using blocks, such as file system 150, to read the data blocks of a file. Method 400 may generally be used to read the file in serial order from the beginning data in the first data block to the ending data in the last data block. In some examples, method 400 may be adapted to read data blocks in any suitable order when a size of each data block is known. For example, one or more pointers and/or indirect blocks may be skipped over to read a file beginning at a specified location other than the beginning. Application of method 400 is now described in the context of the block allocations shown in FIG. 3C based on the offsets for each of the indirect blocks and data blocks.

Using process 410, inode 350 may be read using an offset of 0. Examination of the metadata in inode 350, using process 420, reveals that the file has a file tree with a height of 3. This means that there are two levels of indirect blocks between inode 350 and the data blocks in which the data for the file is stored. Using process 430, pointer 351 may be used to locate indirect block 361 with a block number offset of 246331, which may then be read. Once indirect block 361 is read, pointer 321 may be used to locate indirect block 331 with an offset of 484, which may then be read. Once indirect block 331 is read, a first data block in the file is determined to be located at an offset of 1. The first data block may then be read using process 440.

Use of method 400 with the block allocations of FIG. 3C demonstrates some of the drawbacks of using blocks to store files. Blocks with block numbers that are close in value are generally stored near each other within storage media used to store the blocks of the file system. When two blocks have very different block numbers, such as indirect block 361 with an offset of 246331 and indirect block 331 with an offset of 484, the two blocks are likely to be located in very different parts of the file system.

For example, when the file system is stored using a disk-based storage media, the two blocks may be located on different volumes, platters, tracks, and/or sectors based on the organization of the disk-based storage media. Considerable delay may be introduced when successive reads are directed to blocks in different parts of the file system. In some cases, the larger the difference in the block numbers the longer the delay may be as this may require idle drives to be spun up and/or seek and latency times as drive heads are moved between tracks and/or sectors. Storage access times may generally be improved when blocks are read in consecutive order because blocks with consecutive block numbers are more likely to be physically contiguous within the storage media.

Method 400 is not able to make any adjustment in the order in which the inode, the indirect blocks, and the data blocks are read because method 400 reads each level of the file tree before method 400 determines where the next level of the file tree is stored. Based on the offsets in FIG. 3C, (0, 246331, 484, and 1), reading the file using method 400 may result in delays. This problem may only increase with larger files because the offset for the first indirect block in the level below the inode moves further away from the inode with each successive level added to the file tree.

Figure 5:
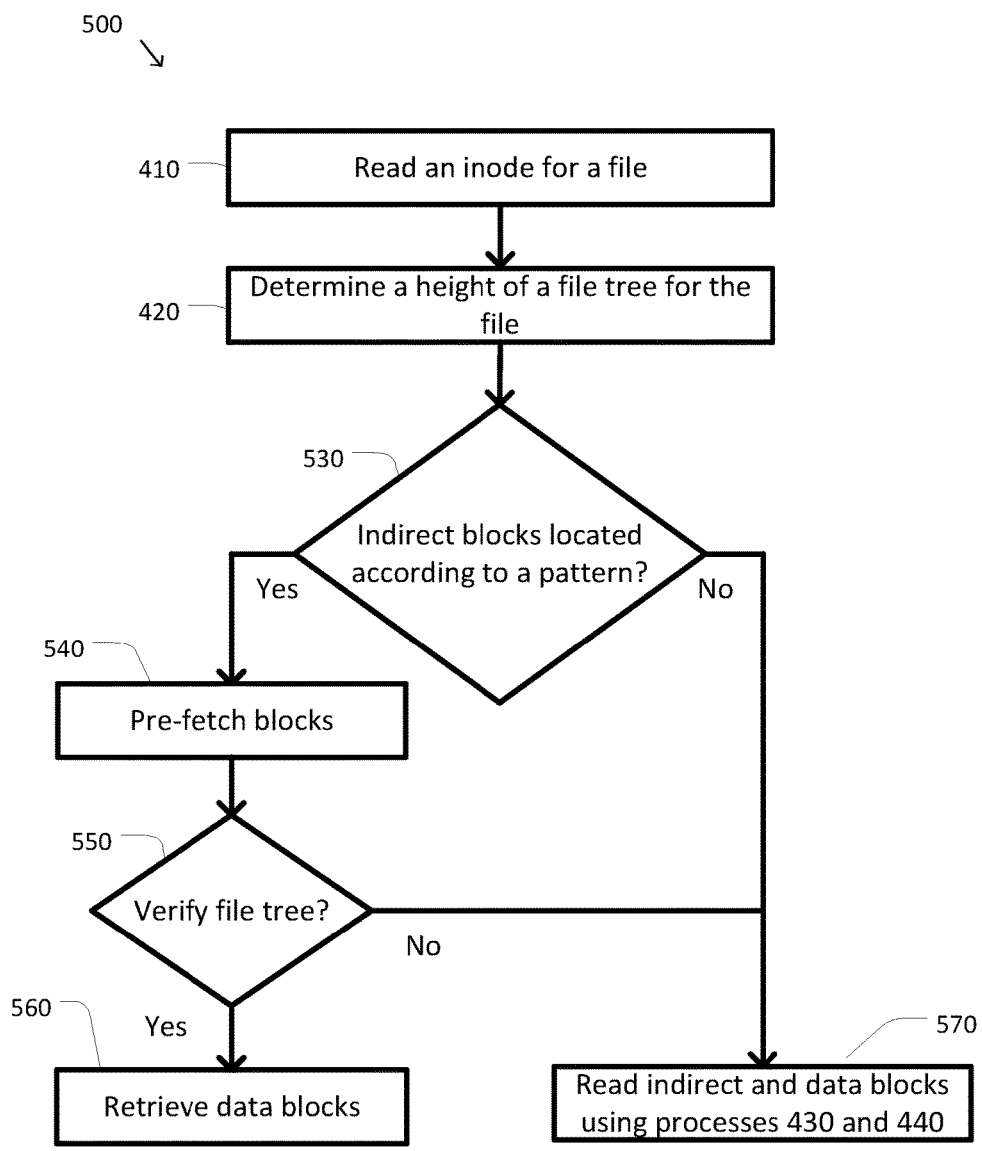
FIG. 5 is a simplified diagram of a method of reading file blocks according to some examples.

FIG. 5 is a simplified diagram of a method 500 of reading file blocks according to some examples. In some examples, one or more of the processes 410, 420, and 530-570 of method 500 may be implemented, at least in part, in the form of executable code stored on non-transient, tangible, machine readable media that when run by one or more processors (e.g., the one or more processors 110 associated with the file system 150) may cause the one or more processors to perform one or more of the processes 410, 420, and 530-570.

Using the process 410, an inode for a file is read. Once the inode is read during the process 410, a height of the file tree for the file is determined using the process 420.

At a process 530, it is determined whether indirect blocks for the file are located according to a pattern. The pointers stored in the inode may be examined to determine whether they are arranged in a pattern indicating a particular way in which the file is stored. For example, when the blocks of the file are allocated consistent with writing in streaming order to consecutively and contiguously located blocks, the pattern among the block offsets in the pointers in the inode may be the same as those shown in FIGS. 3A-3C for the GFS2 file system. In some examples, the height of the file tree determined during process 520 may be used to determine whether the first pointer in the inode has a value consistent with Equation 1. In some examples, pre-computed first pointer values based on file tree height may be used instead to determine whether the first pointer in the inode has a value consistent with Equation 1. In some examples, the pre-computed first pointer values may be stored in a table for lookup. When the first pointer in the inode has a value consistent with the pattern, this may be a strong indication that the blocks of the file are allocated consistent with writing in streaming order to consecutively and contiguously located blocks and blocks may be pre-fetched using a process 540. When the first pointer in the inode does not have a value consistent with the pattern, the file may be read using processes 430 and 440 using a process 570.

At the process 540, blocks are pre-fetched. When the allocation of the indirect blocks and data blocks follows a known pattern, it is possible to locate and read the indirect blocks and the data blocks of a file without having to read the pointers in the indirect blocks first. This makes it possible to intelligently pre-fetch as least some of the indirect blocks and/or the data blocks of the file without first having to traverse the levels of the file tree. In some examples, pre-fetching may be used to read the indirect blocks in a more advantageous order. In the block allocation example of FIG. 3C, it may make more sense to read indirect block 331 (at offset 482) before reading indirect block 361 (at offset 246331) so that the indirect blocks may be read in increasing block number order. In some examples, it may also be advantageous to pre-fetch some of the data blocks. In the block allocation example of FIG. 3C, it may make more sense to read at least some of the data blocks at offsets 1-483 before reading indirect block 331 (at offset 484) as this order allows blocks to be read in consecutive order from the file system starting with inode 350 (at offset 0), then the data blocks at offsets 1-483, and then indirect block 361 at offset 484. Once read, the pre-fetched blocks may be stored in one or more pre-fetch buffers, such as the one or more buffers 140.

At a process 550, the file tree is verified. Even though at least some of the indirect blocks and/or the data blocks may be pre-fetched during process 540, the file tree is verified before relying on any of the pre-fetched blocks. Verification ensures that the pre-fetched blocks are the correct indirect and data blocks for the file. The file tree may be verified by checking the pointers in the inode and the pre-fetched indirect blocks for a set of pointers that lead from the inode and down through the file tree to the data blocks. In some examples, metadata in each of the blocks may also be examined to determine that each of the indirect blocks is an indirect block at the expected tree height and that the data blocks are data blocks. When the file tree is verified, the data blocks are retrieved using a process 560. When the file tree is not verified, the file may be read using processes 430 and 440 using the process 570.

At the process 560, the data blocks are retrieved. Once the file tree is verified during process 550, the data blocks for the file may be retrieved. In some examples, the data blocks may be identified by the pointers in the indirect block at the level of 1 in the file tree when the file tree has a height of 2 or higher or by the pointers in the inode when the file tree has a height of 1. Once identified, the data blocks may be retrieved by reading them from the file system. In some examples, when the data blocks are already read as part of the pre-fetching of process 540, the pre-fetched data blocks may be retrieved from the pre-fetch buffers.

At the process 570, the indirect and data blocks are read using processes 430 and 440. When the block allocation of the file is not consistent with the file being written in streaming order to consecutively and contiguously located blocks, the file tree of the file may be traversed based on the pointers found in the inode and the indirect blocks to locate and read the data blocks using processes 430 and 440.

For some files, the inclusion of processes 530-550 in method 500 may make method 500 less efficient at reading those files than method 400. In most cases, however, the pre-fetching of blocks during process 540 may only occur when the pointer pattern in the inode passes the pattern test of process 530. When the pattern test of process 530 is passed, it is not likely that many files will have a pathological allocation of blocks that may pass the pattern test and result in a false positive, but where the block allocation is not consistent with the file being written in streaming order to consecutively and contiguously located blocks. Because the pattern test is a quick pointer test based on the pointers in the inode read during process 410, the amount of overhead added by process 530 is minor in comparison to the efficiency gains that may be realized by the pre-fetching of blocks during process 540 when the file is consistent with being written in streaming order to consecutively and contiguously located blocks.

As discussed above and further emphasized here, FIG. 5 is merely an example which should not unduly limit the scope of the claims. One of ordinary skill in the art would recognize many variations, alternatives, and modifications. According to certain examples, more than the first pointer in the inode may be consulted during the pattern test of process 530. In some examples, by examining two or more pointers in the inode for consistency with the file being written in streaming order to consecutively and contiguously located blocks, a likelihood of a false positive may be reduced. In some examples, any additional pointers examined may be compared against formulas similar to Equation 1 or pre-computed expected values stored in a table. In some examples, Equation 2 may be used to examine differences in offsets between successive pointers in the inode.

According to certain examples, processes 530-560 may be adapted to look for block allocation patterns and to pre-fetch blocks starting at a level in the file tree below the inode. In some examples, even when the first pointer in the inode may fail the pattern test of process 530, it is possible that portions of the file may be allocated consistent with writing in streaming order to consecutively and contiguously located blocks. In an example based on FIG. 3C, even when the first pointer 351 of inode 350 does not have an expected offset of 246331, it may still be possible that the first pointer 321 of indirect block 361 may have an expected offset of 484 indicating that at least the first portion of the corresponding file may be allocated consistent with writing in streaming order to consecutively and contiguously located blocks. In some examples, the pattern test may be applied any time the file tree is traversed to a lower level to determine whether the portion of the file currently being read may be allocated consistent with writing in streaming order to consecutively and contiguously located blocks.

According to certain examples, processes 530-560 may be adapted for other file systems that store files in blocks. For example, the pattern test of process 530 may be adapted to use formulas and/or pre-computed values that are consistent with the block allocation patterns of these other file systems. For example, the other file systems may include ext2, ext3, and/or similar file systems.

Some examples of a file system may include non-transient, tangible, machine readable media that include executable code that when run by one or more processors may cause the one or more processors to perform the processes of methods 200, 400, and/or 500. Some common forms of machine readable media that may include the processes of methods 200, 400, and/or 500 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method of reading blocks from a file stored in a file system, the method comprising:
   reading a first file block associated with the file from the file system, the first file block including a plurality of first block pointers;
   determining a height of the first file block in a file tree associated with the file;
   selecting a second block pointer from the plurality of first block pointers;
   determining a difference between a value of the second block pointer and a block number of the first file block;
   determining an expected offset between the value of the second block pointer and the block number of the first file block based on the determined height of the first file block and a block allocation pattern, wherein the block allocation pattern corresponds to a portion of the file being stored in streaming order to consecutively and contiguously located blocks of the file system;
   comparing the expected offset with the difference;
   determining whether the value of the second block pointer is consistent with at least the portion of the file having been stored using the block allocation pattern based on the comparing;
   when the value of the second block pointer is consistent with the portion of the file having been stored using the block allocation pattern:
     pre-fetching a second file block from the file system based on the block allocation pattern;
     verifying that the second pre-fetched file block is consistent with the file tree, by checking the plurality of first block pointers and the pre-fetched second file block for a set of pointers that lead from the first file block through one or more indirect blocks to the pre-fetched second file block; and
     retrieving, in response to successfully verifying that the second pre-fetched file block is consistent with the file tree, one or more third data blocks of the file from the file system using the block allocation pattern.

2. The method of claim 1, further comprising when the value of the second block pointer is consistent with the portion of the file having been stored using the block allocation pattern and when the second pre-fetched file block is consistent with the file tree, retrieving the one or more third data blocks of the file based on the block allocation pattern.

3. The method of claim 1, wherein the expected offset is pre-computed and stored in a table indexed by heights of the file tree.

4. The method of claim 1, wherein the second block pointer points to an indirect block from a height of the file tree one below the height of the first file block.

5. The method of claim 1, further comprising, when the value of the second block pointer is not consistent with the portion of the file having been stored using the block allocation pattern or when the second pre-fetched file block is not consistent with the portion of the file having been stored using the block allocation pattern, traversing the file tree to read the one or more third data blocks of the file.

6. A system comprising:
   a memory, storing one or more device drivers and one or more buffers;
   one or more processors, the processors configured to use the one or more buffers to temporarily store data associated with storage operations;
   a file system coupled to the one or more processors;
   a file tree associated with the file system;
   the one or more processors being configured to execute a first one of the one or more device drivers, the first device driver configured to:
     read a file block from the file tree, the file block including a plurality of first block pointers;
     determine a height of the file block in the file tree;
     select a second block pointer from the plurality of first block pointers;
     determine a difference between a value of the second block pointer and a block number of a first file block;
     determine an expected offset between the value of the second block pointer and the block number of the first file block based on the determined height of the first file block and a block allocation pattern, wherein the block allocation pattern corresponds to a portion of a file being stored in streaming order to consecutively and contiguously located blocks of the file system;
     compare the expected offset with the difference;
     determine whether the value of the second block pointer is consistent with at least the portion of the file, having been stored using the block allocation pattern based on the compare;
     pre-fetch a second file block from the file system based on the block allocation pattern;
     verify that the second pre-fetched file block is consistent with the file tree, by checking the plurality of first block pointers and the pre-fetched second file block for a set of pointers that lead from the first file block through one or more indirect blocks to the pre-fetched second file block; and
     retrieve, in response to successfully verifying that the second pre-fetched file block is consistent with the file tree, one or more third data blocks of the file from the file system using the block allocation pattern.

7. The system of claim 6, wherein the first device driver is further configured to:
   store the pre-fetched second file block in the one or more buffers.

8. The system of claim 6, wherein the first device driver is further configured, when the value of the second block pointer selected from the first block pointers is not consistent with the block allocation pattern, to traverse the file tree to read one or more data blocks of the file.

9. The system of claim 6, wherein the first device driver is further configured to determine whether successive block pointers selected from the first block pointers are consistent with the portion of the file having been stored using the block allocation pattern.

10. The system of claim 9, wherein the successive block pointers selected from the first block pointers are consistent with the portion of the file having been stored using the block allocation pattern when the successive block pointers differ by $1+\Sigma_{i=2}^{k}\Pi_{j=2}^{i}h(j)$, where h(j) is a pointer capacity of each indirect file block of the file tree at a height j within the file tree and k is a height of the file block.

11. A non-transitory machine-readable medium comprising a plurality of machine-readable instructions which, when executed by one or more processors associated with a file system, are configured to cause the one or more processors to perform a method comprising:
- reading a first file block associated with a file from the file system, the first file block including a plurality of first block pointers;
- determining a height of the first file block in a file tree associated with the file;
- selecting a second block pointer from the plurality of first block pointers;
- determining a difference between a value of the second block pointer and a block number of the first file block;
- determining an expected offset between the value of the second block pointer and the block number of the first file block based on the determined height of the first file block and a block allocation pattern, wherein the block allocation pattern corresponds to a portion of the file being stored in streaming order to consecutively and contiguously located blocks of the file system;
- comparing the expected offset with the difference;
- determining whether the value of the second block pointer is consistent with at least the portion of the file having been stored using the block allocation pattern based on the comparing;
- when the value of the second block pointer is consistent with the portion of the file having been stored using the block allocation pattern:
  - pre-fetching a second file block from the file system based on the block allocation pattern;
  - verifying that the second pre-fetched file block is consistent with the file tree, by checking the plurality of first block pointers and the pre-fetched second file block for a set of pointers that lead from the first file block through one or more indirect blocks to the second file block; and
  - retrieving, in response to successfully verifying that the second pre-fetched file block is consistent with the file tree, one or more third data blocks of the file from the file system using the block allocation pattern.

12. The non-transitory machine-readable medium of claim 11, further comprising comparing a difference between successive block pointers selected from the first block pointers to determine whether the successive block pointers differ by $1+\Sigma_{i=2}^{k}\Pi_{j=2}^{i}h(j)$, where h(j) is a pointer capacity of each indirect file block of the file tree at a height j within the file tree and k is a height of the first file block.

13. The non-transitory machine-readable medium of claim 11, wherein the expected offset is pre-computed and stored in a table indexed by heights of the file tree.

14. The non-transitory machine-readable medium of claim 11, wherein when the value of the second block pointer is not consistent with the portion of the file having been stored using the block allocation pattern or when the second pre-fetched file block is not consistent with the portion of the file having been stored using the block allocation pattern, the method further comprises traversing the file tree to read the one or more third data blocks of the file.

15. The non-transitory machine-readable medium of claim 11 wherein:
- the pre-fetched second file block is an indirect block from the file tree;
- the indirect block includes metadata and one or more third block pointers; and
- verifying that the second pre-fetched file block is consistent with the file tree comprises:
  - determining whether a height of the indirect block is consistent with the metadata.

16. The non-transitory machine-readable medium of claim 11, wherein when the value of the second block pointer is consistent with the portion of the file having been stored using the block allocation pattern, the method further comprises retrieving the one or more third data blocks of the file based on the block allocation pattern.

* * * * *